(12) United States Patent
Kawahito et al.

(10) Patent No.: US 8,896,984 B2
(45) Date of Patent: Nov. 25, 2014

(54) SOLID ELECTROLYTIC CAPACITOR

(71) Applicant: Panasonic Corporation, Osaka (JP)

(72) Inventors: Kazuo Kawahito, Osaka (JP); Takashi Iwakiri, Kyoto (JP)

(73) Assignee: Panasonic Corporation, Osaka (JP)

( * ) Notice: Subject to any disclaimer, the term of this patent is extended or adjusted under 35 U.S.C. 154(b) by 156 days.

(21) Appl. No.: 13/762,438

(22) Filed: Feb. 8, 2013

(65) Prior Publication Data

US 2013/0222977 A1  Aug. 29, 2013

(30) Foreign Application Priority Data

Feb. 28, 2012  (JP) .................. 2012-041639

(51) Int. Cl.
| | |
|---|---|
| H01G 9/15 | (2006.01) |
| H01G 9/028 | (2006.01) |
| H01G 9/10 | (2006.01) |
| H01G 9/08 | (2006.01) |
| H01G 9/00 | (2006.01) |
| H01G 9/012 | (2006.01) |

(52) U.S. Cl.
CPC .............. H01G 9/15 (2013.01); H01G 9/028 (2013.01); H01G 9/10 (2013.01); H01G 9/08 (2013.01); H01G 9/0036 (2013.01); H01G 9/012 (2013.01)
USPC ........... 361/523; 361/525; 361/528; 361/529; 361/535; 361/540

(58) Field of Classification Search
CPC ........... H01G 9/15; H01G 9/08; H01G 9/012; H01G 9/028; H01G 9/10; H01G 9/0036
USPC ......... 361/523, 516–519, 525, 528, 529–530, 361/540, 508–509, 532–535
See application file for complete search history.

(56) References Cited

U.S. PATENT DOCUMENTS

| | | | | |
|---|---|---|---|---|
| 6,229,689 | B1 * | 5/2001 | Kobayashi et al. ........... | 361/525 |
| 7,916,457 | B2 * | 3/2011 | Horio et al. .................... | 361/541 |
| 7,961,454 | B2 * | 6/2011 | Matumoto et al. ............ | 361/528 |
| 7,974,077 | B2 * | 7/2011 | Matsuoka et al. ............. | 361/540 |
| 8,139,344 | B2 * | 3/2012 | Navratil et al. ................ | 361/528 |
| 8,213,160 | B2 * | 7/2012 | Saito et al. .................... | 361/540 |
| 8,279,584 | B2 * | 10/2012 | Zednickova ................... | 361/529 |
| 2009/0231784 | A1 | 9/2009 | Matsuoka et al. | |

FOREIGN PATENT DOCUMENTS

| | | |
|---|---|---|
| JP | 2001-358041 | 12/2001 |
| JP | 2009-218502 | 9/2009 |

* cited by examiner

*Primary Examiner* — Nguyen T Ha
(74) *Attorney, Agent, or Firm* — Panasonic Patent Center

(57) ABSTRACT

A solid electrolytic capacitor includes a capacitor element including a cathode portion and an anode portion, a cathode terminal bonded to the cathode portion, an anode terminal bonded to the anode portion, and an enclosure resin covering the capacitor element. The cathode terminal includes a cathode lower surface portion, a cathode connection portion, and a cathode support portion. The cathode connection portion is connected to an end portion of the cathode lower surface portion on an anode side and bonded to the cathode portion through a conductive adhesive. The cathode support portion is connected to a side portion of the cathode lower surface and brought into contact with a lower surface of the cathode portion on an end portion side of the cathode portion without involving the conductive adhesive therebetween.

7 Claims, 3 Drawing Sheets

SOLID ELECTROLYTIC CAPACITOR

BACKGROUND

1. Technical Field

The present invention relates to a solid electrolytic capacitor formed by connecting an external lead terminal to a capacitor element.

2. Description of the Related Art

Along with miniaturization, thinning, and digitalization of electronic equipment, a demand for a thin solid electrolytic capacitor used therein having a large capacitance and a low ESR (Equivalent Series Resistance) grows.

As illustrated in FIG. 7, a conventional solid electrolytic capacitor is formed of capacitor element 51, cathode terminal 52 connected to a cathode portion, anode terminal 53 connected to an anode portion, and enclosure resin 55. Enclosure resin 55 covers part of cathode terminal 52, part of anode terminal 53, and capacitor element 51.

Cathode terminal 52 is bent in a step-like pattern from a lower surface of cathode electrode 52 which is exposed from mounting surface 56, and an upper end portion thus bent is bonded to a lower surface of the cathode portion of capacitor element 51 through conductive adhesive 54.

Anode terminal 53 is bent upwardly from a lower surface of anode terminal 53 which is exposed from mounting surface 56, and an upper end portion thus bent is bonded to the anode portion of capacitor element 51 by welding.

A solid electrolyte layer made of a conductive polymer having excellent conductivity is used for capacitor element 51 to realize a low ESR.

In such a solid electrolytic capacitor, a larger capacitance is realized by increasing a surface area of an anode element on which a dielectric oxide film is formed.

Known as a related art document relating to the invention of the present application is, for example, Unexamined Japanese Patent Publication No. 2009-218502.

SUMMARY

To increase a capacitance of such a conventional solid electrolytic capacitor, an outside dimension of the cathode portion of capacitor element 51 is enlarged, a thickness of enclosure resin 55 is made thinner so that a storage efficiency is increased. However, in an assembling process of bonding capacitor element 51 to cathode terminal 52 and anode terminal 53, there are cases where an end portion of the cathode portion inclines downwardly due to a positional deviation of capacitor element 51 as illustrated in FIG. 7. Accordingly, it is difficult to reliably cover an end portion side of the cathode portion with enclosure resin 55, and capacitor element 51 becomes susceptible to an influence of oxygen or moisture absorption. As a result, this causes a problem such as an increase in the ESR or a leakage current.

It is an object of the present invention to solve the conventional problem and provide a solid electrolytic capacitor excellent in an ESR characteristic and a leakage current characteristic and having a large capacitance.

The present invention relates to a solid electrolytic capacitor including a capacitor element including a cathode portion and an anode portion, a cathode terminal bonded to the cathode portion, an anode terminal bonded to the anode portion, and an enclosure resin covering the capacitor element. The cathode terminal includes a cathode lower surface portion, a cathode connection portion, and a cathode support portion. The cathode lower surface portion is exposed from a mounting surface and includes an upper surface thereof on which the enclosure resin is provided. The cathode connection portion is connected to an end portion of the cathode lower surface portion on an anode side and bonded to the cathode portion through a conductive adhesive. The cathode support portion is connected to a side portion of the cathode lower surface and brought into contact with a lower surface of the cathode portion on an end portion side of the cathode portion without involving the conductive adhesive therebetween.

As described above, according to the present invention, the cathode terminal is provided with the cathode support portion that is brought into contact with the lower surface on an end portion side of the cathode portion without involving the conductive adhesive therebetween. An upper end portion of the cathode support portion prevents a lower surface on an end portion side of the cathode portion of a capacitor element from inclining downwardly. Accordingly, it is possible to reliably cover the end portion of the cathode portion of the capacitor element with the enclosure resin. Further, the cathode support portion of the cathode terminal is in a non-fixed state before forming the enclosure resin. For this reason, it is possible to reduce a physical stress to be applied to the cathode portion during a process of forming the solid electrolytic capacitor, and suppress an increase of the leakage current. With this arrangement, it is possible to provide a solid electrolytic capacitor excellent in an ESR characteristic and a leakage current characteristic and having a large capacitance.

DETAILED DESCRIPTION OF THE PREFERRED EMBODIMENT

Exemplary Embodiment

A solid electrolytic capacitor according to an embodiment of the present invention will be described.

Figure 1:
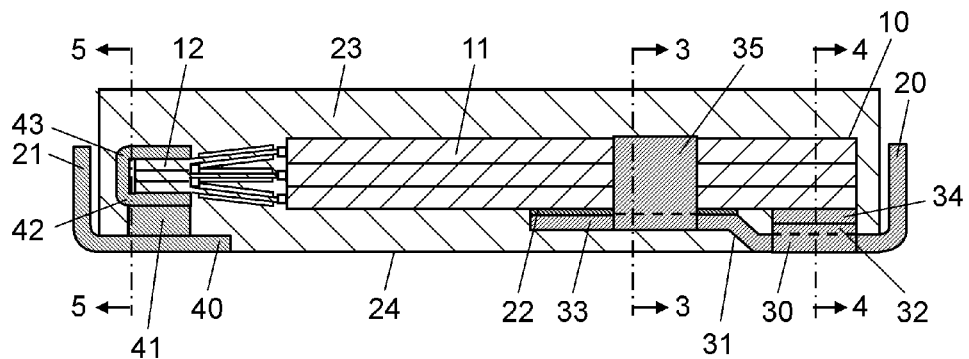
FIG. 1 is a front cross sectional view of a solid electrolytic capacitor according to this embodiment.
Figure 2:
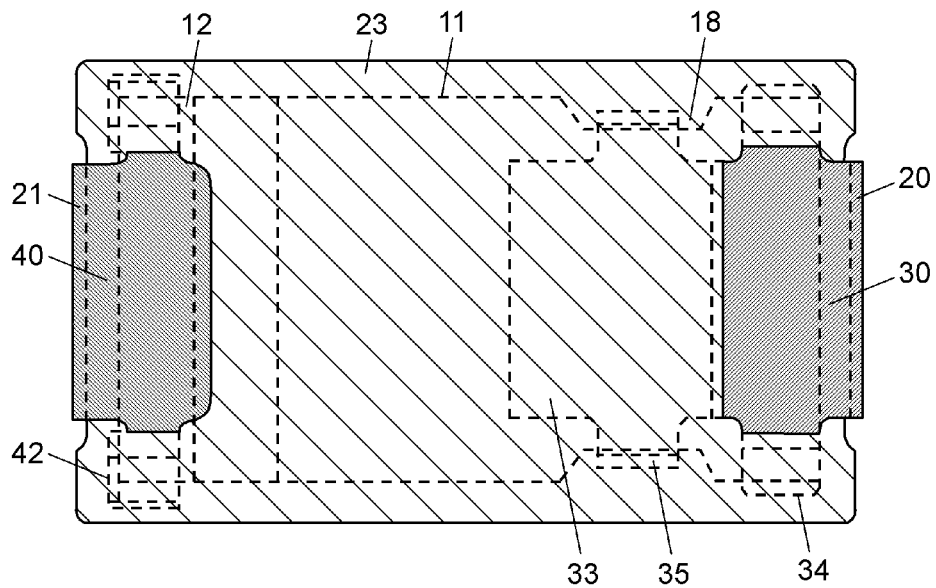
FIG. 2 is a bottom view of the solid electrolytic capacitor according to this embodiment.
Figure 3:
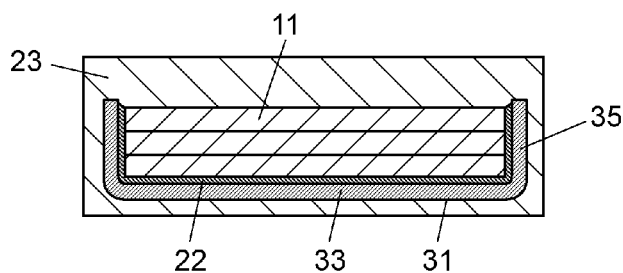
FIG. 3 is a cross sectional view of the solid electrolytic capacitor illustrated in FIG. 1 and taken along a line 3-3.
Figure 4:
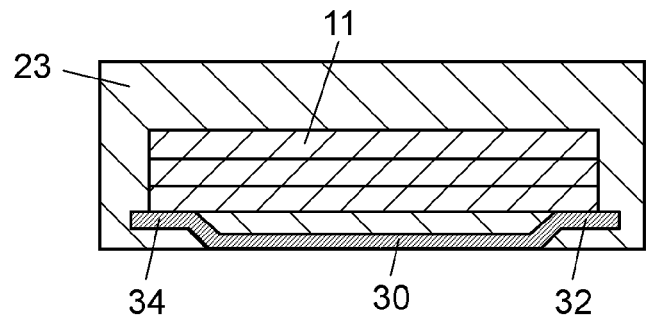
FIG. 4 is a cross sectional view of the solid electrolytic capacitor illustrated in FIG. 1 and taken along a line 4-4.
Figure 5:
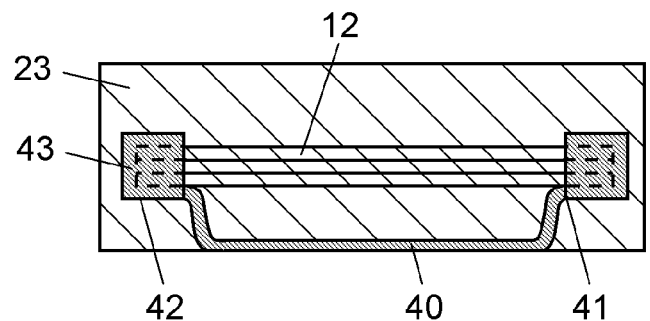
FIG. 5 is a cross sectional view of the solid electrolytic capacitor illustrated in FIG. 1 and taken along a line 5-5.
Figure 6:
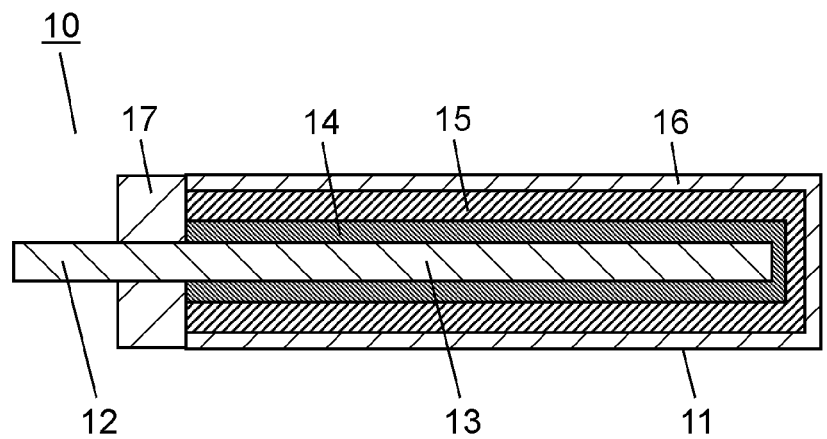
FIG. 6 is a cross sectional view of a capacitor element according to this embodiment.
Figure 7:
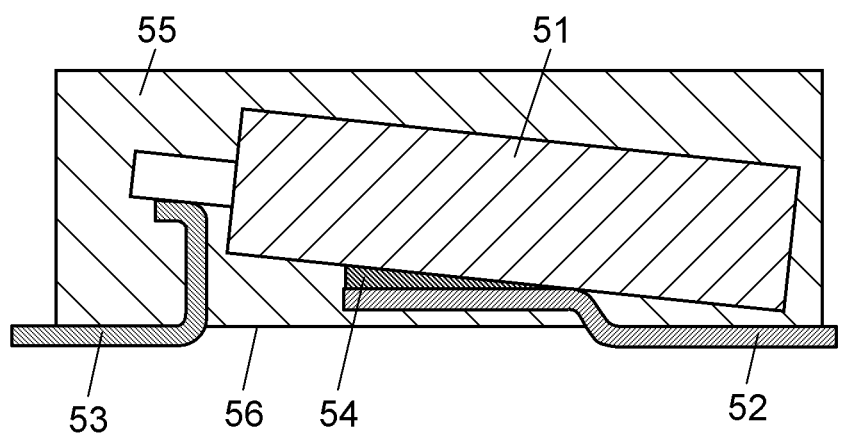
FIG. 7 is a front cross sectional view illustrating a problem of a conventional solid electrolytic capacitor.

FIG. 1 is a front cross sectional view of a solid electrolytic capacitor according to this embodiment, and FIG. 2 is a bottom view of the same. FIG. 3 is a cross sectional view of a cathode connection portion taken along a line 3-3 illustrated in FIG. 1. FIG. 4 is a cross sectional view of a cathode support portion taken along a line 4-4 illustrated in FIG. 1. FIG. 5 is a cross sectional view of an anode connection portion taken along line 5-5 illustrated in FIG. 1. FIG. 6 is a cross sectional view of a capacitor element included in the solid electrolytic capacitor according to the embodiment.

As illustrated in FIG. 1, a solid electrolytic capacitor according to the embodiment includes a plurality of flat capacitor elements 10, cathode terminal 20, anode terminal 21, and enclosure resin 23. Capacitor element 10 includes cathode portion 11 and anode portion 12. Cathode terminal 20 is bonded to cathode portions 11 which are laminated together, and anode terminal 21 is bonded to anode portions 12 which are laminated together. Enclosure resin 23 covers part of cathode terminal 20, part of anode terminal 21, and capacitor elements 10 which are laminated together. A single piece of capacitor element 10 may be provided instead.

As illustrated in FIG. 6, anode portion 12 of capacitor element 10 is one end portion side of anode element 13 of a foil made of valve metal such as aluminum. Cathode portion 11 of capacitor element 10 is the other end portion side of anode element 13 which is separated by insulating separation portion 17 provided in a band-like shape.

As the valve metal, tantalum, niobium, titanium, or the like can be used in addition to aluminum, and anode element 13 on a side of cathode portion 11 may be formed of a porous sintered body made of powder of the valve metal.

Cathode portion 11 of capacitor element 10 is provided sequentially with dielectric oxide film 14 formed on a surface of anode element 13, solid electrolyte layer 15 made of a conductive polymer, and cathode layer 16 formed by laminating a silver paste layer on a carbon layer.

Polypyrrole, polythiophene, polyaniline, or the like can be used for the conductive polymer of the solid electrolyte which has high conductivity and is excellent in the ESR characteristic. Here, manganese oxide or the like containing manganese dioxide can be used for the solid electrolyte.

Enclosure resin 23 is formed of a heat-resistant insulating resin such as epoxy resin.

Conductive adhesive 22 is formed by using a conductive paste obtained by mixing metallic particles such as silver or copper and a thermosetting resin such as epoxy resin.

Cathode terminal 20 and anode terminal 21 use lead frames of a metallic member, as a base material, of a metal such as copper, iron, or nickel, or an alloy thereof.

As illustrated in FIGS. 1 and 2, cathode lower surface portion 30 is a part of cathode terminal 20, and anode lower surface portion 40 is a part of anode terminal 21. Cathode lower surface portion 30 and anode lower surface portion 40 are exposed from enclosure resin 23 on mounting surface 24 of the solid electrolytic capacitor. A lower surface of cathode lower surface portion 30 and a lower surface of anode lower surface portion 40 are flush with a lower surface of enclosure resin 23. In addition, the lower surface of enclosure resin 23 is mounting surface 24.

As illustrated in FIGS. 4 and 5, enclosure resin 23 is provided on an upper surface of cathode lower surface portion 30 and an upper surface of anode lower surface portion 40, and enclosure resin 23 is provided between a lowermost layer of cathode portions 11 which are laminated and cathode lower surface portion 30, and between a lowermost layer of anode portions 12 which are laminated and anode lower surface portion 40.

As illustrated in FIG. 2, cathode lower surface portion 30 extends from an end portion on a cathode side of mounting surface 24 toward an anode side in a length direction, and anode lower surface portion 40 extends from an end portion on an anode side of mounting surface 24 toward the cathode side in the length direction.

Shapes of cathode lower surface portion 30 and anode lower surface portion 40 on mounting surface 24 are substantially rectangular, and it is preferable to arrange an identical mounting area for the both.

Here, a direction in which anode portion 12 and cathode portion 11 are connected together is referred to as a "length direction", a side of anode portion 12 in the length direction is referred to as an "anode side", a side of cathode portion 11 in the length direction is referred to as a "cathode side", and a direction perpendicular to the length direction is referred to as a "width direction".

Further, as illustrated in FIG. 1, a front end portion of cathode terminal 20 and a front end portion of anode terminal 21 are bent upwardly along individual end surfaces of the solid electrolytic capacitor from an end portion of cathode lower surface portion 30 and an end portion of anode lower surface portion 40, respectively.

Plating layers for soldering with a circuit board are individually provided at cathode lower surface portion 30, anode lower surface portion 40, and the front end portion of anode terminal 21 and the front end portion of cathode terminal 20 which are bent along the end surfaces.

Cathode terminal 20 further includes cathode connection portion 31 to be bonded to cathode portion 11 while conductive adhesive 22 is interposed therebetween, and cathode support portion 32 making contact with a lower surface on an end portion side of cathode portion 11 while conductive adhesive 22 is not interposed therebetween.

As illustrated in FIGS. 1 to 3, cathode connection portion 31 is connected to an end portion on the anode side (left side in FIG. 1) of cathode lower surface portion 30, and a shape formed by connecting cathode lower surface portion 30 and cathode connection portion 31 together is a step-like shape.

Further, a width of cathode connection portion 31 is identical with a width of cathode lower surface portion 30. Cathode connection portion 31 is bent vertically or obliquely upward inside enclosure resin 23 from an entire width of the end portion on the anode side of cathode lower surface 30. An upper end portion of cathode connection portion 31 thus bent upward has second upper step portion 33.

Second upper step portion 33 of cathode connection portion 31 is positioned outward of the anode side of cathode lower surface portion 30, and enclosure resin 23 is provided on a lower surface of second upper step portion 33. Further, an upper surface of second upper step portion 33 is flat, has a predetermined distance from mounting surface 24, and is parallel to mounting surface 24.

It is preferable that a center of second upper step portion 33 in the length direction be positioned toward an end portion side of cathode portion 11 from a center of cathode portion 11.

Conductive adhesive 22 is provided between the upper surface of second upper step portion 33 and a lower surface of cathode portion 11, and bonds second upper step portion 33 and cathode portion 11 to each other. It is preferable to form conductive adhesive 22 in a region equal to or larger than 60% of the upper surface of second upper step portion 33, and more preferable to form conductive adhesive 22 on an entire upper surface of second upper step portion 33.

As illustrated in FIGS. 1, 2, and 4, cathode support portion 32 is connected to a part of a side portion in the width direction of cathode lower surface portion 30, and a shape formed by connecting cathode lower surface portion 30 and cathode support portion 32 together is a step-like shape.

Further, cathode support portion 32 is bent vertically or obliquely upward inside enclosure resin 23 from a side portion in the width direction of cathode lower surface portion 30, and a pair of cathode support portions 32 are provided in both side portions in the width direction of cathode lower surface portion 30. In addition, an upper end portion of cathode support portion 32 has first upper step portion 34.

As illustrated in FIG. 4, an upper surface of first upper step portion 34 of cathode support portion 32 has a predetermined distance from mounting surface 24, and is substantially parallel to mounting surface 24. Enclosure resin 23 is provided on a lower surface of first upper step portion 34.

By providing enclosure resin 23 on the lower surface of first upper step portion 34, it is possible to suppress deformation of cathode lower surface portion 30 and secure mountability.

Further, first upper step 34 is bent outwardly in the width direction with respect to cathode lower surface portion 30, and is preferably formed outward a side portion in the width direction of cathode lower surface portion 30. With this arrangement, first upper step portion 34 is positioned outward an end portion of the cathode side of second upper step portion 33. Since the upper surface of first upper portion 34 is distanced from the upper surface of second upper step portion 33, it is possible to prevent the conductive paste from spreading and reaching first upper step portion 34 when conductive adhesive 22 is formed on second upper step portion 33. With this structure, first upper step portion 34 is reliably arranged in a non-fixed state with respect to capacitor element 10.

As illustrated in FIGS. 1 and 2, an end portion of the cathode side of second upper step portion 33 is a bend portion on an upper end side in which cathode connection portion 31 is bent from the upper end portion thereof downwardly.

Further, as illustrated in FIG. 4, it is preferable that a front end portion in the width direction of first upper step portion 34 be provided in a manner to protrude in the width direction from a side portion of cathode portion 11 in the width direction. Since the vicinity of the front end in the width direction of first upper step portion 34 is covered with enclosure resin 23, it is possible to suppress deformation of cathode lower surface portion 30 and secure mountability.

First upper step portion 34 may be bent inwardly in the width direction and positioned immediately above the upper surface of cathode lower surface portion 30.

It is preferable that the upper surface of first upper step portion 34 make contact with an end portion in the width direction of the lower surface of a lowermost layer of cathode portions 11 which are laminated. In addition, the upper surface of first upper step portion 34 is substantially flush with the upper surface of second upper step portion 33. Further, an area of the upper surface of first upper step portion 34 is smaller than an area of the upper surface of second upper step portion 33. It is preferable that the upper surface of first upper step portion 34 be higher than the upper surface of second upper step portion 33 by an amount of a thickness of conductive adhesive 22 provided in second upper step portion 33.

First upper step portion 34 and cathode portion 11 are in a non-fixed state before capacitor element 10 is covered with enclosure resin 23. With this arrangement, in the case where a stress is exerted so that first upper step portion 34 and cathode portion 11 deviate from each other, since they are not bonded together by conductive adhesive 22, cathode support portion 32 and cathode portion 11 are movable with respect to each other. Further, when capacitor element 10 is covered with enclosure resin 23, cathode support portion 32 and cathode portion 11 are put into a fixed state in which they are not movable with respect to each other due to enclosure resin 23.

In this way, cathode support portion 32 is connected to the side portion in the width direction of cathode lower surface portion 30 and makes contact with the lower surface on the end portion side of cathode portion 11 without involving conductive adhesive 22 therebetween. With this arrangement, during a process of assembling the solid electrolytic capacitor, it is possible to prevent the end of cathode portion 11 from inclining downward, so that the end of cathode portion 11 can be reliably covered with enclosure resin 23. As a result, it is possible to prevent the ESR from increasing when the solid electrolyte of the conductive polymer experiences oxygen degradation, and the leakage current from increasing when capacitor element 10 absorbs moisture.

The end portion of cathode portion 11 is in a non-fixed state with respect to cathode terminal 20 during a process of bonding capacitor element 10 to cathode terminal 20 and anode terminal 21, and a process of forming enclosure resin 23. For this reason, it is possible to reduce a physical stress to be applied to cathode portion 11 caused by thermal expansion of cathode terminal 20 or processing variations of the lead frame, and suppress an increase of the leakage current.

As illustrated in FIGS. 1 to 3, it is preferable that cathode terminal 20 have cathode holder portions 35. Cathode holder portions 35 are provided as a pair to both side portions in the width direction of second upper step portion 33. Cathode holder portion 35 is arranged along a plane identical with second upper step portion 33 and protrudes from second upper step portion 33 in the width direction, is bent upwardly at right angle, and is arranged along the side portion in the width direction of cathode portions 11 which are laminated.

As illustrated in FIG. 2, it is preferable that notch portions 18 be formed in cathode portion 11. Notch portions 18 are provided in both side portions in the width direction of cathode portion 11 away from the end portion of cathode portion 11.

Cathode holder portion 35 is fitted into notch portion 18 of cathode portion 11, and is bonded to cathode portion 11 through conductive adhesive 22 provided between the side portion in the width direction of cathode portion 11 and cathode holder portion 35.

Further, since cathode holder portion 35 is fitted into notch portion 18 of cathode portion 11, it is possible to enlarge a surface area of capacitor element 10 and arrange a large capacitance and a low ESR.

As illustrated in FIG. 5, anode connection portion 41 is connected to a part of a side portion in the width direction of anode lower surface 40, and is bent vertically or obliquely upward inside enclosure resin 23 from a side portion in the width direction of cathode lower surface portion 40. Anode connection portions 41 are provided as a pair in both side portions in the width direction of anode lower surface portion 40. Further, anode connection portions 41 have anode placing portions 42 positioned outwardly of both side portions in the width direction of anode lower surface portion 40, and anode placing portions 42 have a flat shape to hold a lower surface of anode portion 12.

As illustrated in FIG. 1, anode connection portions 41 have anode holder portions 43 individually connected to anode placing portions 42, and anode placing portion 43 extends upwardly along an end portion in the length direction of anode portions 12 which are laminated. Further, anode holder portion 43 is bent inwardly in the length direction along an upper surface of anode portion 12, and is provided in a manner to enclose anode portions 12 which are laminated.

Anode holder portion 43 and the upper surface of anode portions 12 which are laminated are bonded together by laser welding or resistance welding.

Next, a description will be given of a method for manufacturing the solid electrolytic capacitor according to the embodiment in the case where a plurality of capacitor elements 10 are used.

First, a lead frame having a thickness of 0.1 mm to 0.2 mm in which cathode terminal 20 and anode terminal 21 are integrally formed is prepared, and capacitor element 10 is placed in first upper step portion 34 and second upper step portion 33 of cathode terminal 20, and anode placing portion 42.

When capacitor element 10 is placed, the conductive paste serving as conductive adhesive 22 is applied to at least either second upper step portion 33 in which cathode portion 11 is placed, or cathode portions 11 which are stacked and placed in second upper step portion 33. Next, cathode portion 11 of capacitor element 10 is placed in first upper step portion 34 and second upper step portion 33.

Subsequently, the conductive paste is sequentially applied to capacitor elements 10, and a plurality of capacitor elements 10 are laminated. Capacitor elements 10 thus laminated are pressurized so that the conductive paste is sandwiched and spread between cathode portion 11 and second upper step portion 33, cathode portion 11 and cathode portion 11, and cathode portion 11 and cathode holder portion 35. Further, the conductive paste is cured at a high temperature between 110° C. and 200° C. to form conductive adhesive 22.

In contrast, as to anode portions 12, an end portion of anode holder portion 43 is bent and is brought into contact with anode portions 12 which are laminated. Next, laser light is emitted from an upper surface of an end portion of anode holder portion 43 to weld anode portions 12 and anode terminal 21 together, and laminated anode portions 12 together.

Subsequently, capacitor elements 10 bonded to cathode terminal 20 and anode terminal 21 are subjected to transfer molding. During this process, enclosure resin 23 is formed in a manner that capacitor element 10, cathode connection portion 31, cathode support portion 32, and anode connection portion 41 are covered, and the lower surface of cathode lower surface portion 30 and the lower surface of anode surface portion 40 are exposed from mounting surface 24. Then, cathode terminal 20 and anode terminal 21 are cut off from the lead frame in a manner that the front end portion of cathode terminal 20 and the front end portion of anode terminal 21 are arranged to be flush with mounting surface 24 and project from an end portion of enclosure resin 23. The front end portion of cathode terminal 20 and the front end portion of anode terminal 21 are bent along an end surface of enclosure resin 23 to thereby obtain the solid electrolytic capacitor.

The solid electrolytic capacitor according to the present invention provides an effect in which an ESR characteristic and a leakage current characteristic are excellent, and a large capacitance can be arranged. Therefore, the solid electrolytic capacitor according to the present invention is useful for the solid electrolytic capacitor formed by connecting an external lead terminal to a capacitor element.

What is claimed is:

1. A solid electrolytic capacitor comprising:
    a capacitor element including a cathode portion and an anode portion;
    a cathode terminal bonded to the cathode portion;
    an anode terminal bonded to the anode portion; and
    an enclosure resin for covering the capacitor element,
    wherein the cathode terminal comprises:
        a cathode lower surface portion exposed from a mounting surface of the enclosure resin and including an upper surface on which the enclosure resin is present:
        a cathode connection portion connected to an end portion of the cathode lower surface portion on an anode side and bonded to the cathode portion through a conductive adhesive; and
        a cathode support portion connected to a side portion of the cathode lower surface and brought into contact with a lower surface of the cathode portion on an end portion side of the cathode portion without involving the conductive adhesive therebetween.

2. The solid electrolytic capacitor according to claim 1, wherein an upper end portion of the cathode support portion includes a first upper step portion brought into contact with the lower surface of the cathode portion, and the enclosure resin is present on a lower surface of the first upper step portion.

3. The solid electrolytic capacitor according to claim 2, wherein an upper end portion of the cathode connection portion includes a second upper step portion bonded to the lower surface of the cathode portion, and the first upper step portion of the cathode support portion is positioned outward of a side portion on a cathode side of the second upper step portion of the cathode connection portion.

4. The solid electrolytic capacitor according to claim 2, wherein a front end portion in a width direction of the first upper step portion of the cathode support portion is provided in a manner to protrude from a side portion in a width direction of the cathode portion.

5. The solid electrolytic capacitor according to claim 3, wherein the cathode terminal further comprises cathode holder portions individually connected to both side portions in a width direction of the second upper step portion of the cathode support portion.

6. The solid electrolytic capacitor according to claim 5, wherein the cathode holder portion is fitted into a notch portion in a side portion in a width direction of the cathode portion.

7. The solid electrolytic capacitor according to claim 6, wherein the cathode holder portion and the cathode portion are bonded to each other through the conductive adhesive.

* * * * *